(12) United States Patent
Adkins et al.

(10) Patent No.: US 9,370,828 B2
(45) Date of Patent: Jun. 21, 2016

(54) ADJUSTABLE DOWELING JIG

(75) Inventors: Edward D. Adkins, Rockford, IL (US); Joe Karkosch, Palatine, IL (US); David R. Watermann, Hampshire, IL (US)

(73) Assignee: Nomis LLC, Palatine, IL (US)

( * ) Notice: Subject to any disclaimer, the term of this patent is extended or adjusted under 35 U.S.C. 154(b) by 876 days.

(21) Appl. No.: 13/526,626

(22) Filed: Jun. 19, 2012

(65) Prior Publication Data
US 2012/0257938 A1 Oct. 11, 2012

Related U.S. Application Data

(63) Continuation-in-part of application No. 12/813,154, filed on Jun. 10, 2010, now Pat. No. 8,651,777.

(51) Int. Cl.
*B23B 47/28* (2006.01)

(52) U.S. Cl.
CPC ........... *B23B 47/288* (2013.01); *B23B 2247/12* (2013.01); *Y10T 29/49826* (2015.01); *Y10T 408/567* (2015.01)

(58) Field of Classification Search
CPC .... B23B 47/28; B23B 47/287; B23B 47/288; B23B 2247/12; Y10T 408/567; Y10T 408/56245
USPC ................................................ 408/115 R, 97
See application file for complete search history.

(56) References Cited

U.S. PATENT DOCUMENTS

| | | | | |
|---|---|---|---|---|
| 1,335,347 | A * | 3/1920 | Moulds | 408/88 |
| 2,470,038 | A * | 5/1949 | Long | B23B 47/288 408/109 |
| 2,602,238 | A * | 7/1952 | Wellman | 408/241 G |
| 2,836,087 | A * | 5/1958 | Ehresmann | 408/115 R |
| 2,949,798 | A * | 8/1960 | Berta, Jr. | E04F 21/003 33/563 |
| 4,137,003 | A | 1/1979 | Budoff | |
| 4,602,898 | A | 7/1986 | Brown et al. | |
| 4,684,299 | A | 8/1987 | Laliberte | |
| 4,865,496 | A | 9/1989 | Challis | |
| 5,024,564 | A | 6/1991 | Lloyd | |
| 5,466,098 | A | 11/1995 | Juang | |
| 5,807,036 | A | 9/1998 | Lostlen | |
| 6,244,795 | B1 | 6/2001 | Fenelon | |
| 7,726,916 | B2 * | 6/2010 | MacKenzie Turner et al. | 408/97 |
| 2001/0036389 | A1 * | 11/2001 | Park | 408/103 |
| 2011/0305536 | A1 | 12/2011 | Adkins et al. | |

FOREIGN PATENT DOCUMENTS

GB  2071537 A * 9/1981  .............. B23B 47/28
WO  WO 2011/156268 A2  12/2011

OTHER PUBLICATIONS

Wolfcraft, Universal dowelling set, manual downloaded from the internet, http://www.wolfcraft.de/jcatalog_generated/en/products/product_groups/1012_product.html, downloaded on Sep. 7, 2010, 45 pages.

(Continued)

*Primary Examiner* — Daniel Howell
*Assistant Examiner* — Chwen-Wei Su
(74) *Attorney, Agent, or Firm* — Reinhart Boerner Van Deuren P.C.

(57) ABSTRACT

An adjustable doweling jig is provided. The adjustable doweling jig has a pair of bore guide carriers that are symmetrically and simultaneously adjustable relative to a base structure of the doweling jig. The bore guide carriers carry a plurality of bore guides such that dowel holes can be placed using the bore guides at a broad range of locations, limited only by the size of the jig.

11 Claims, 16 Drawing Sheets

(56) References Cited

OTHER PUBLICATIONS

DOWELMAX Precision Engineered Joining System; brochure; known prior to Jun. 19, 2012; 6 pages.

DRILL JointPro Model 1311; manual; 2011; 16 pages.
Taking a Look at Doweling Jigs; ShopNotes No. 116; known prior to Jun. 19, 2012; 4 pages.

* cited by examiner

US 9,370,828 B2

ADJUSTABLE DOWELING JIG

CROSS-REFERENCE TO RELATED PATENT APPLICATIONS

This patent application is a Continuation-in-Part of co-pending U.S. patent application Ser. No. 12/813,154, filed Jun. 10, 2010 the entire teachings and disclosure of which are incorporated herein by reference thereto.

FIELD OF THE INVENTION

This invention generally relates to tools for woodworking and more specifically to doweling jigs used for placing dowel holes in a workpiece.

BACKGROUND OF THE INVENTION

Doweling jigs are used in woodworking to generate dowel holes in a workpiece. The jig has several bore guides arranged at fixed distances relative to a reference point of the jig. The bore guides generally have open bores that allow a boring tool such as a drill to pass through a portion of the jig and drill dowel holes in the workpiece. The holes receive dowels used to join workpieces together. Once a dowel hole is drilled, a portion of a dowel is inserted into the dowel hole, leaving a portion of the dowel exposed. The workpiece is then joined to a subsequent workpiece having a like dowel hole, generated by a similar process, by inserting the exposed portion of the dowel into the dowel hole of the subsequent workpiece. The above process is generally used in the formation of "face," "corner" and "T" joints commonly used in woodworking.

Unfortunately, contemporary doweling jigs present several drawbacks. For example, contemporary doweling jigs are designed to place dowel holes at several fixed dimensions relative to a reference point of the jig. Accordingly, when a workpiece is clamped against the reference point of the jig, the bore guide is positioned at a fixed distance relative to the workpiece. As a result, contemporary doweling jigs are limited to forming dowel holes at a number of predefined locations as measured from a reference point of the jig, regardless of the dimensions of the workpiece operated upon.

Additionally, many doweling jigs operate on a single workpiece at a time. Once dowel holes are formed in that workpiece, the jig is removed, and mounted to a subsequent workpiece. Unfortunately, because of this refixturing, there is a risk that the resulting dowel holes will not properly match up with the first board's dowel holes, so that there is a noticeable and undesirable edge at the joint formed by the boards. Such a result is particularly undesirable where a flat surface between mating boards is desired, such as in table tops or other similar designs.

In view of the above, there is a desire in the art for a doweling jig that alleviates the above problems as well as other problems associated with current doweling jig designs.

Embodiments of the invention provide such a doweling jig. These and other advantages of the invention, as well as additional inventive features, will be apparent from the description of the invention provided herein.

BRIEF SUMMARY OF THE INVENTION

In view of the above, embodiments of the present invention provide an adjustable doweling jig that overcomes existing problems in the art. More particularly, embodiments of the present invention provide a new and improved adjustable doweling jig having a plurality of bore guides that are adjustable relative to a base so that the jig is not limited to a predefined number of bore guide locations. Still more particularly, embodiments of the present invention provide an adjustable doweling jig that has a plurality of bore guides that are simultaneously positionable relative to multiple boards using a single control, thereby reducing labor costs and the time required to manufacture the holes. Still more particularly, embodiments of the present invention provide an adjustable doweling jig that reduces or minimizes mating doweling hole mismatch by allowing a user to manufacture multiple doweling holes in multiple boards in a single fixturing operation.

In a first aspect, embodiments of the invention provide an adjustable doweling jig having a base defining a first reference point against which a workpiece is positioned during a boring operation. A bore guide carrier having at least one bore guide, is adjustably positionable relative to the base to adjust the position of the bore guide relative to the first reference point. The adjustable doweling jig according to this aspect further includes a reference abutment providing a second reference point, the bore guide carrier being adjustably positionable relative to the second reference point such that clamping a reference board between the bore guide carrier and the second reference point positions the bore guide relative to the first reference point such that the bore guide is centered on the workpiece when the workpiece is positioned against the first reference point.

In a subsidiary embodiment of the first aspect, the reference abutment is adjustably positionable relative to the base to adjust the position of the second reference point relative to the first reference point. In a further subsidiary embodiment of the first aspect, the bore guide carrier and reference abutment move in equal and opposite directions relative to the base.

In yet another subsidiary embodiment of the first aspect, the adjustable doweling jig further includes an adjustment mechanism, wherein the reference abutment and bore guide carrier are mechanically coupled to the adjustment mechanism. According to this subsidiary embodiment, the adjustment mechanism has a single control for simultaneously positioning the bore guide carrier and reference abutment symmetrically relative to the base.

In yet another subsidiary embodiment of the first aspect, half of the distance between an inner most surface of the bore guide carrier and the reference abutment is equal to the distance from the first reference point to a center axis of the bore guide.

In yet another subsidiary embodiment of the first aspect, the at least one bore guide is removable from the bore guide carrier. In another embodiment, the at least one bore guide is formed as part of the bore guide carrier such that the at least one bore guide is provided by a bore extending through the bore guide carrier.

In a second aspect, embodiments of the invention provide an adjustable doweling jig that includes a base having an abutment structure. The adjustable doweling jig further includes a first and a second bore guide carrier and an adjustment mechanism configured to simultaneously adjust a position of each of the first and second bore guide carriers symmetrically relative to the abutment structure.

In a subsidiary embodiment of the second aspect, the adjustment mechanism has a single adjustment control, and wherein manipulation of the single adjustment control simultaneously adjusts the positions of the first and second bore guide carriers symmetrically relative to the abutment structure. Additionally, and in other subsidiary embodiments of the second aspect, the adjustment mechanism includes a lead screw in mechanical communication with the single adjustment control. The lead screw has a first threaded portion and a second threaded portion having threads in an opposite direction as the first threaded portion. The first and the second bore guide carriers are coupled to the lead screw. The first bore guide carrier moves along the first threaded portion in a first direction and the second bore guide carrier moves along the second threaded portion in a second direction. The first and second directions are opposite one another such that manipulation of the single control causes the first and second bore guide carriers to move in equal and opposite directions relative to the abutment structure.

In another subsidiary embodiment of the second aspect, the first bore guide carrier carries at least one first bore guide and the second bore guide carrier carries at least one second bore guide. The at least one first and second bore guides each having an opening extending therethrough that defines a center axis of each of the at least one first and second bore guides.

In a further subsidiary embodiment of the second aspect, the first bore guide carrier has a first reference abutment and the second bore guide carrier has a second reference abutment. The first and second reference abutments are configured to clamp a reference work piece therebetween such that the reference work piece is centered relative to a center line of the abutment structure.

In yet another subsidiary embodiment of the second aspect, half of the linear distance between the first and the second reference abutments is equal to a linear distance measured from the center axis of the first bore guide to a first abutment surface of the abutment structure regardless of the position of the first bore guide carrier. Additionally, the linear distance between the first and the second reference abutments is equal to a linear distance measured from the center axis of the second bore guide to the second abutment surface of the abutment structure regardless of the position of the second bore guide carrier.

In yet another subsidiary embodiment of the second aspect, half of the linear distance between the first and second reference surfaces is equal to the linear distance between the first reference abutment and the center axis of the first bore guide. Additionally, half of the linear distance between the first and second reference surfaces is equal to the linear distance between the second reference abutment and the center axis of the second bore guide.

In a third aspect, embodiments of the invention provide a method for boring doweling holes, that includes the steps of clamping a first work piece against a first abutment surface of an abutment structure and adjusting simultaneously the position of a bore guide carrier and the position of a reference abutment relative to the abutment structure to center a first bore guide on the first work piece.

In a subsidiary embodiment of the third aspect, the step of adjusting includes adjusting the position of the bore guide carrier and the position of the reference abutment such that a reference work piece is clamped therebetween. In yet another subsidiary embodiment of the third aspect, the step of adjusting includes moving the bore guide carrier and the reference abutment in equal and opposite directions relative to the abutment structure.

In yet another subsidiary embodiment of the third aspect, the step of clamping a second work piece against a second abutment surface of the abutment structure prior to the step of adjusting, and the step of adjusting further comprises centering a second bore guide on the second work piece. In still another subsidiary embodiment of the third aspect, the step of adjusting includes centering the first bore guide on the first work piece and the second bore guide on the second work piece symmetrically relative to a center of the abutment structure.

In a fourth aspect, embodiments of the invention provide an adjustable doweling jig including a base that has an abutment portion providing first and second reference points against which workpieces can be located. A first bore guide carrier provides a first bore guide having a first central axis. A second bore guide carrier provides a second bore guide having a second central axis. The first and second bore guide carriers being movable relative to the abutment portion. The adjustable doweling jig further includes an adjustment mechanism coupled to the first and second bore guide carriers to adjust the position of the first and second bore guide carriers relative to the abutment portion. Such adjustment occurs such that a first distance between the first center axis and the first reference point always remains equal to a second distance between the second center axis and the second reference point.

In a subsidiary embodiment of the fourth aspect, the first bore guide carrier has a first abutment surface and the second bore guide carrier has a second abutment surface. The first abutment surface and the first center axis are spaced apart by a third distance. The second abutment surface and the second center axis are spaced apart by a fourth distance. The first and second reference points are spaced apart a fifth distance. The sum of the third distance and the fourth distance is equal to the fifth distance. In yet another subsidiary embodiment of the fourth aspect, the third distance is equal to half of the fifth distance, and the fourth distance is equal to half of the fifth distance.

In another aspect, an adjustable doweling jig is provided. An adjustable doweling jig according to this aspect includes a base structure including an abutment portion that defines a first locating surface for locating a workpiece. At least one adjustable bore guide carrier is mounted to the base structure and adjustable relative thereto. The at least one adjustable bore guide carrier is in abutted contacted with a second locating surface provided by the base structure. At least one adjustment mechanism for biasing the at least one bore guide carrier into abutted contact with the at least one second locating surface is also provided.

The base structure includes a horizontal structure, and an abutment structure removable from the horizontal structure. The abutment structure includes a pair of locating tabs and the horizontal structure includes a pair of locating slots. The locating tabs are received by the locating slots when the abutment structure is installed in the horizontal structure.

Each locating slot includes a pair of machine locating surfaces in opposed space relation. The pair of machine locating surfaces are spaced at a distance substantially equal to a width of each of the pair of locating tabs.

The at least one adjustable bore guide carrier includes a pair of inner most bore guide carriers, and a pair of outer most bore guide carriers. The inner most bore guide carriers include inner most projections which abut the second locating surface and include outer most projections which abut inner most projections of the outer most bore guide carriers.

In a subsidiary embodiment, the at least one adjustment mechanism includes a pair of adjustment mechanisms. Each of the pair of adjustment mechanisms includes a set screw. One set screw is positioned to bias one of the outer most pair of bore guide carriers into abutted contact with one of the inner most pair of bore guide carriers. The other set screw is positioned to bias the other one of the outer most bore guide carriers into abutted contact with the other one of the inner most pair of bore guide carriers.

In another aspect, an adjustable doweling jig is provided. The adjustable doweling jig includes a base having an abutment structure. A first and second bore guide carrier are positioned on either side of the abutment structure. An adjustment mechanism is provided for adjusting the position of each of the first and second bore guide carriers relative to the abutment structure.

In certain embodiments, the base includes a horizontal structure, and the abutment structure is removably mounted to the horizontal structure. The first and second bore guide carriers are removably mounted to the horizontal structure.

The abutment structure includes a pair of locating tabs each having machined opposed first locating surfaces. The horizontal structure includes a pair of locating slots each having a pair of machined opposed second locating surfaces. The first and second machined locating surfaces are in contact with one another such that the abutant structure is substantially perpendicular to the horizontal structure.

The adjustment mechanism includes a first set screw position to bias the first bore guide carrier towards the abutment structure. The adjustment mechanism also includes a second set screw positioned to bias the second bore guide carrier towards the abutment structure.

In yet another aspect, a method for manufacturing a doweling jig is provided. A method according to this aspect includes forming a horizontal structure, and forming an abutment structure. The method also includes machining a pair of first locating surfaces in opposed space relation to one another on the abutment structure. The method also includes machining two pairs of second locating surfaces on the horizontal structure. The second locating surfaces of each pair are in opposed space relation. The method also includes installing the abutment structure on the horizontal structure such that the pair of first locating surfaces are in abutted contact with the two pairs of second locating surfaces.

In certain embodiments, the step of machining a pair of first locating surfaces includes machining opposed sides of the abutment structure. In certain embodiments, the step of machining the two pairs of second locating surfaces includes machining opposed sides of a pair of slots.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
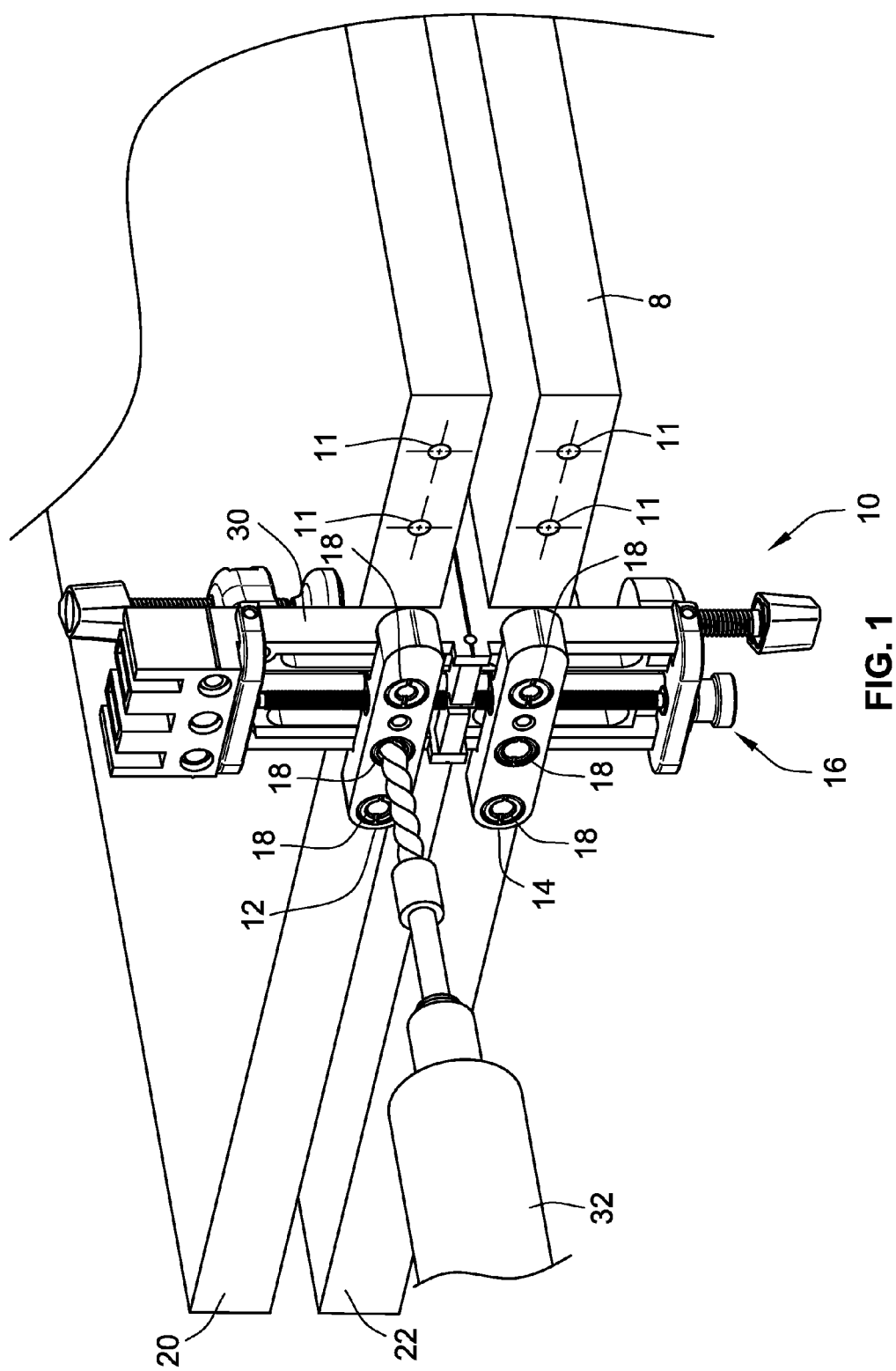
FIG. 1 is a perspective view of an exemplary embodiment of an adjustable doweling jig according to the teachings of the present invention mounted on a work table with work pieces clamped thereto.

Turning now to the drawings, an adjustable doweling jig 10 mounted to a work table 8 is illustrated in FIG. 1. The adjustable doweling jig 10 has a pair of adjustable bore guide carriers 12, 14 that are adjustable relative to a base structure 30 of the doweling jig 10. The bore guide carriers 12, 14 are adjustable by way of an adjustment mechanism 16 to thereby position a plurality of bore guides 18 relative to a pair of work pieces 20, 22 clamped to the adjustable doweling jig 10.

In the illustrated embodiment, the bore guide carriers 12, 14 are identical. However, it is recognized that they may take on different forms, independent of one another, in other embodiments. The bore guides 18 are adjustable to a variety of locations and do not have an otherwise fixed position such as in the prior art devices described above. Once the bore guides 18 are positioned in a desired location, a boring tool 32 can then be used to place the appropriate dowel holes 11 in the workpieces 20, 22.

Figure 2:
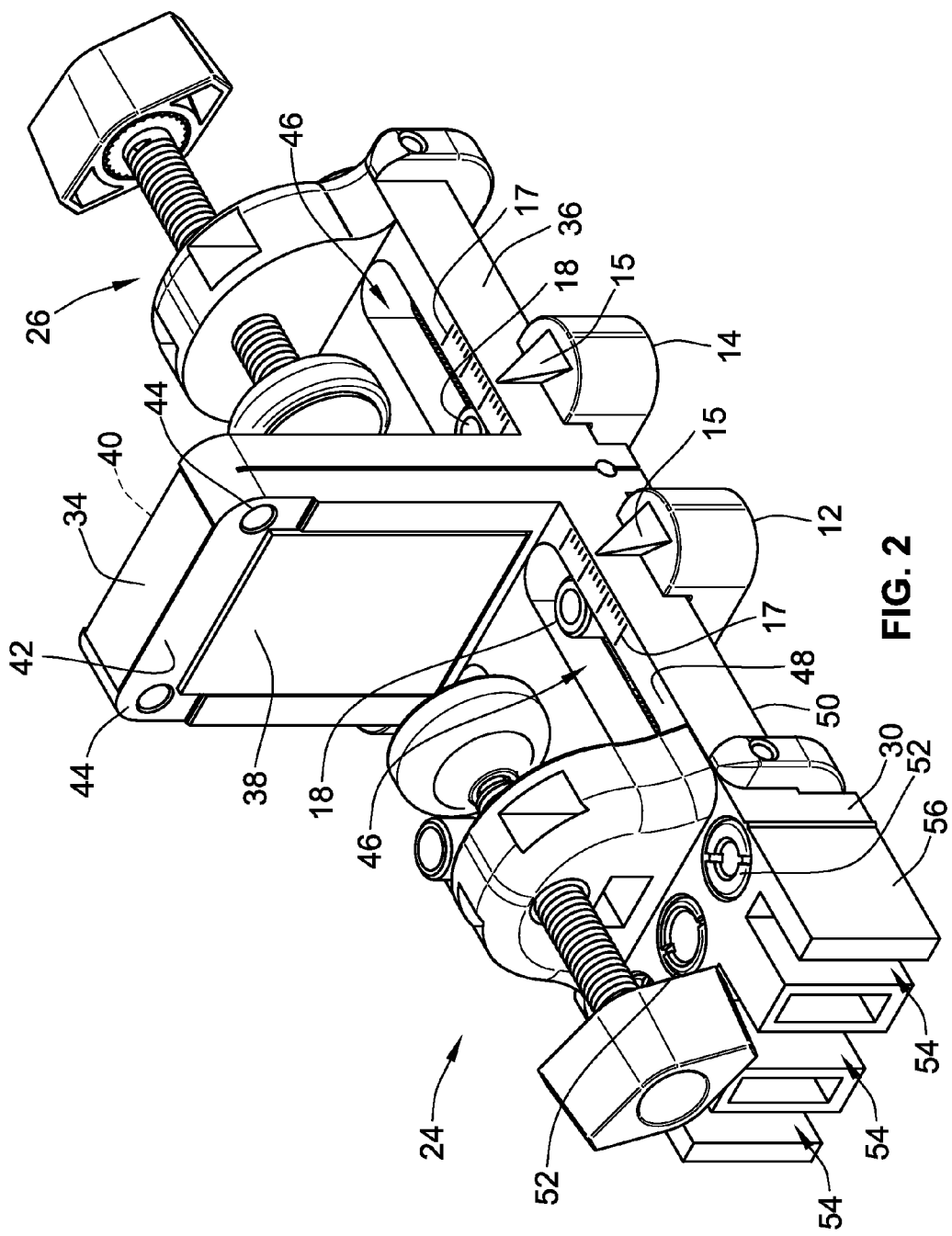
FIG. 2 is a perspective view of the doweling jig of FIG. 1.

With reference to FIG. 2, the base structure 30 has an abutment portion 34 and a horizontal portion 36. The abutment portion 34 extends generally transversely away from the horizontal portion 36. The abutment portion 34 has a first and a second abutment surface 38, 40 (see also FIG. 3) on opposing sides of the abutment portion 34. Each of the first and second abutment surfaces 38, 40 functions as a reference point to abut work pieces 20, 22 thereagainst. Although illustrated as forming a portion of the sides of the abutment portion 34, the first and second abutment surfaces 38, 40 can each encompass, respectively, an entire side of the abutment portion 34 in other embodiments.

The abutment portion 34 also has a clamp mounting feature provided by a locating surface 42 and locating holes 44. The locating surface 42 and locating holes 44 are configured to provide for an alternative mounting location for one of a pair of clamp assemblies 24, 26. As will be described in greater detail below, this allows the adjustable doweling jig 10 the flexibility to manufacture doweling holes 11 (see FIG. 1) for several types of joints, e.g. face and corner joints.

The horizontal portion 36 of the base structure 30 is generally rectangular in shape and has a plurality of slots 46 extending through top and bottom surfaces 48, 50 thereof. The slots 46 are dimensioned to allow clearance for the bore guides 18. The slots 46 also permit the boring tool 32 to pass through the horizontal portion 36 and reach work pieces 20, 22 mounted to the adjustable doweling jig 10 as illustrated in FIG. 1.

The horizontal portion 36 also carries a plurality of static bore guides 52 at a distal end 56 thereof. A plurality of dowel slots 54 are also formed into the same distal end 56. The static bore guides 52 and dowel slots 54 are generally aligned to allow the adjustable doweling jig 10 to be used to form dowel holes for "T" type joints.

Figure 3:
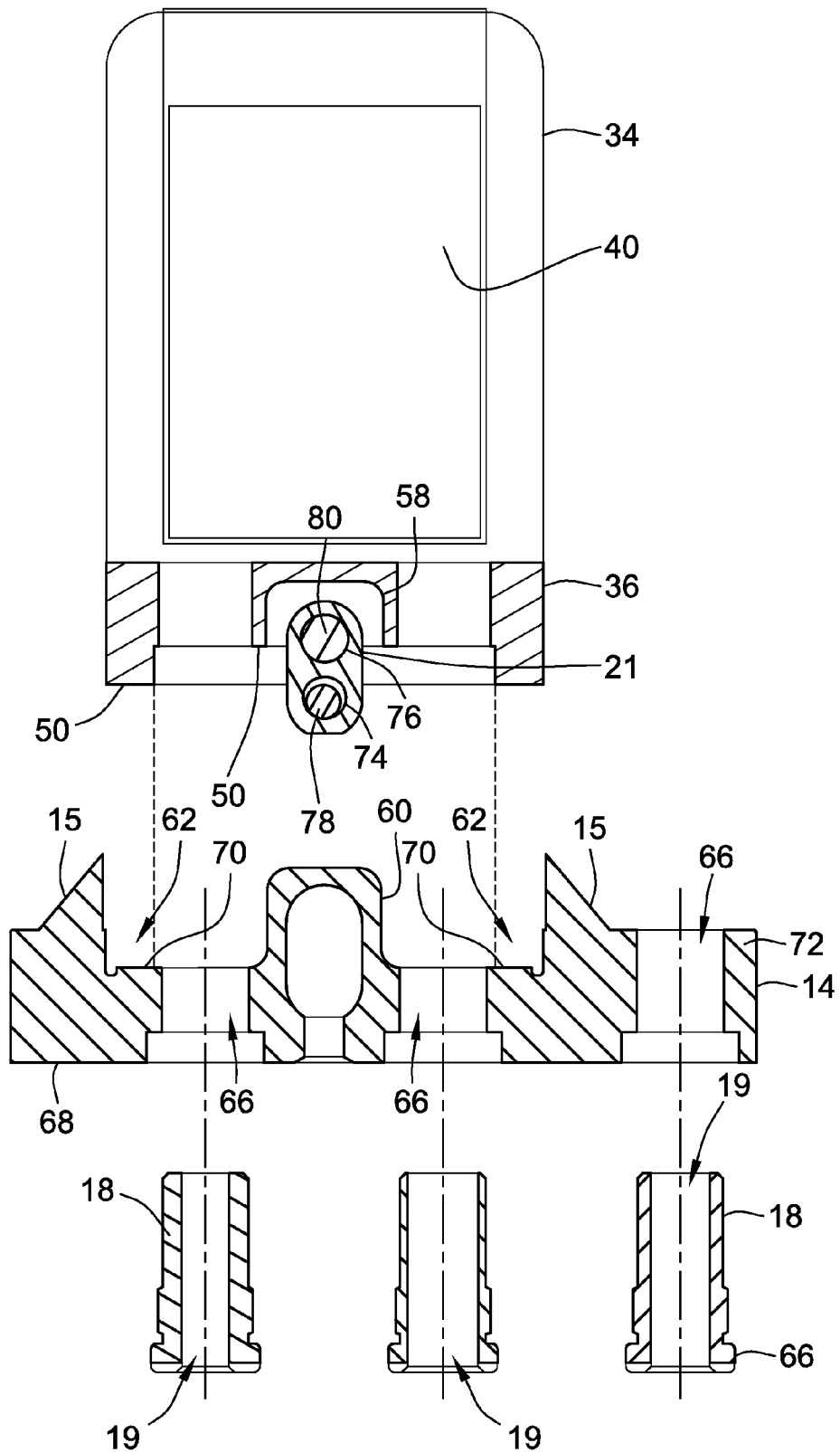
FIG. 3 is an exploded partial side cross section of the adjustable doweling jig of FIG. 1.

With reference to FIG. 3, a channel 58 is formed into the bottom 50 of the horizontal portion 36 of the base structure 30. The channel 58 functions to locate the bore guide carriers 12, 14 relative to the base structure 30 by receiving a central projection 60 of each bore guide carrier 12, 14. The channel 58 and the central projection 60 cooperate to allow for the smooth sliding movement of the bore guide carriers 12, 14 relative to the base structure 30.

Each bore guide carrier 12, 14 has a channel 62 on either side of the central projection 60. Each channel 62 has a flat bottom with a bore guide hole 66 extending from a bottom surface 68 of each bore guide carrier 12, 14 to a bottom surface 70 of the channel 62. Each bore guide carrier 12, 14 has an additional bore guide hole 66 located approximate to a distal end 72 of each bore guide carrier 12, 14. It is recognized, however, that each bore guide carrier 12, 14 can carry fewer or more bore guides 18 in other embodiments, and is not limited to the specific configuration illustrated.

The bore guide holes 66 are dimensioned to receive and retain the bore guides 18 therein. The bore guides 18 are generally cylindrical in shape with an open bore 19 extending therethrough. As illustrated in FIG. 3, the bore guides 18 can possess various inner diameters to receive various sizes of boring tools 32 (see FIG. 1). Alternatively, the bore guide carriers 12, 14 can directly provide bore guides that form a portion of the bore guide carriers 12, 14. For example, a bore guide could be molded or machined into each bore guide carrier 12, 14 and function as a bore guide. As such, the bore guides 18 need not be removable, but can be. However, one advantage of removable bore guides 18 is the ability to quickly configure the doweling jig 10 for various operations.

Each bore guide carrier 12, 14 can also include a visual indicator 15 configured to indicate the position of the bore guide carriers 12, 14, and more specifically the center axis of the bore guides 18, relative to the base structure 30. Additionally, the horizontal portion 36 of the base structure 30 can include a linear scale 17 (see FIG. 1) on the top surface 48 that is generally aligned with the visual indicator 15 of each of the bore guide carriers 12, 14. The scale 17 can provide additional dimensional information of the position of the bore guide carriers 12, 14 relative to the base structure 30.

The bore guide carriers 12, 14 are adjustable relative to the base structure 30 through mechanical communication with the adjustment mechanism 16 (see FIG. 1). With reference to FIG. 3, the central projection of the illustrated bore guide carrier 14 carries a collar 21 having a threaded hole 74 and a smooth hole 76 that allow the passage therethrough of a dual threaded lead screw 78 and guide rod 80 of the adjustment mechanism 16. As the lead screw 78 rotates, the bore guide carriers 12, 14 simultaneously move in equal and opposite directions toward or away from the abutment portion 34 of the base structure 30. In alternative embodiments, the collar 21 can be omitted, and the threaded and smooth holes 74, 76 can be formed directly in the bore guide carriers 12, 14.

Figure 4:
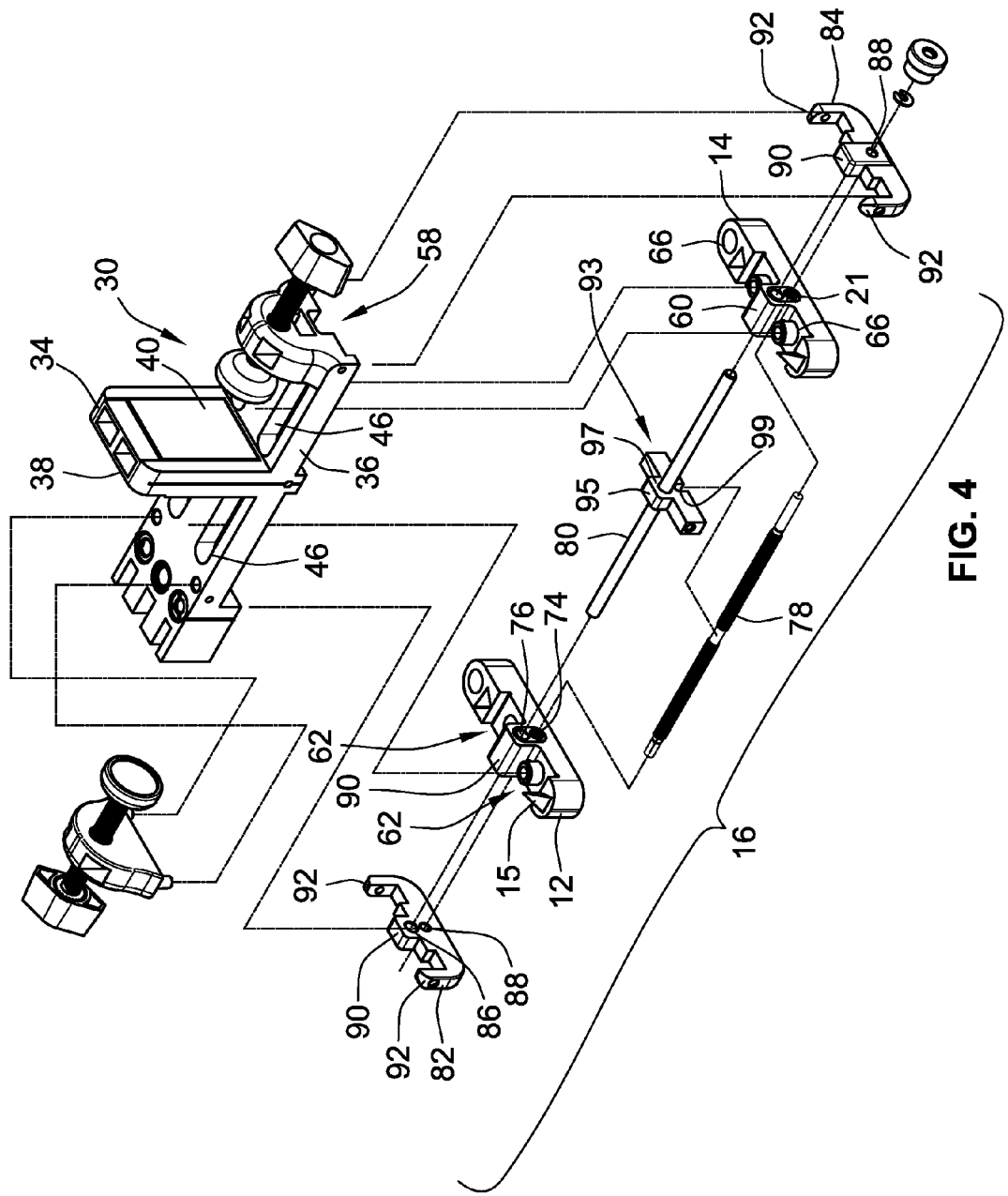
FIG. 4 is an exploded perspective view of the doweling jig of FIG. 1.

With reference to FIG. 4, the equal and opposite movement of the bore guide carriers 12, 14 is made possible in part by supplying the lead screw 78 as a dual threaded lead screw having a first threaded portion 108 and a second threaded portion 110 formed in an opposite direction of the first threaded portion 108. One bore guide carrier 12 remains in mechanical communication with the first threaded portion 110, while the other bore guide carrier 14 remains in mechanical communication with the second threaded portion 110 during operation. As such, the threaded length of each of the threaded portions 108, 110 generally defines the limits of travel of each bore guide carrier 12, 14 in mechanical communication therewith.

The guide rod 80 is generally parallel with the lead screw 78, and minimizes or substantially reduces the tendency of the bore guide carriers 12, 14 to rotate commensurate with rotation of the lead screw 78. It will also be recognized that the position of the bore guides 18 within the slots 46 and the position of the central projection 60 within the channel 58 also assist in reducing the tendency of the bore guide carriers 12, 14 to rotate commensurate with the rotation of the lead screw 78. By preventing such rotation, the bore guide carriers 12, 14 translate laterally upon rotation of the lead screw 78.

The distal ends of each of the lead screw 78 and guide rod 80 are supported by bearing blocks 82, 84. The bearing blocks 82, 84 permit the lead screw 78 and guide rod 80 to rotate relative thereto. As illustrated in FIG. 4, each bearing block 82, 84 has a hole 86 for receipt of a distal end of the guide rod 80 and a hole 88 for receipt of a distal end of the lead screw 78. Similar to the bore guide carriers 12, 14, each bearing block 82, 84 has a central projection 90 that is received by the channel 58 of the horizontal portion 36 of the base structure 30. Each bearing block 82, 84 has a pair of peripheral projections 92 at either end thereof such that each bearing block 82, 84 generally encompasses a portion of the horizontal portion 36 of the base structure 30 and mounts thereagainst.

The adjustment mechanism 16 can also be supplied with a support block 93 that also supports the guide rod 80 and lead screw 78. The support block 93 has a central projection 95 received by the channel 58 of the base structure 30, and is generally mounted to an underside thereof. The support block 93 has a smooth hole 97 for receipt of the guide rod 80, and a notch 99 for receipt of a typically unthreaded portion of the lead screw 78. The smooth hole 97 and notch 99 allow the guide rod 90 and lead screw 78 to freely rotate relative to the support block 93.

Figure 5:
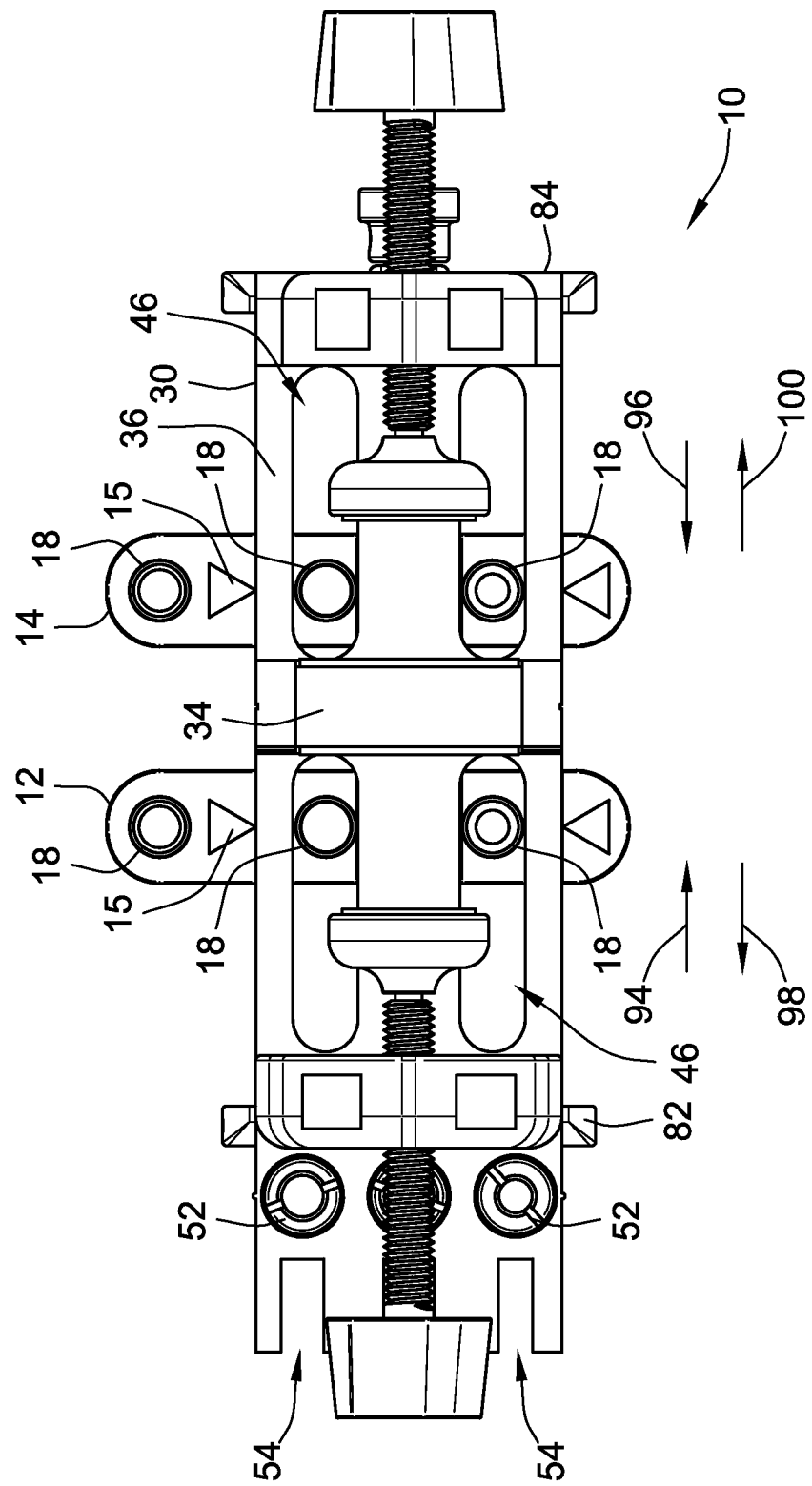
FIG. 5 is a top view of the doweling jig of FIG. 1.

With reference to FIG. 5, in addition to the threaded portions 108, 110 of the lead screw 78 as described above and illustrated in FIG. 4, the bearing blocks 82, 84 also generally define the outer limits or travel of the bore guide carriers 12, 14 respectively. As will be discussed in greater detail below, under operation of the adjustment mechanism 16, each bore guide carrier 12, 14 will move in equal and opposite directions represented by arrows 94, 96 toward one another or in equal and opposite directions represented by arrows 98, 100 away from one another. It will be recognized that such functionality allows the bore guide carriers 12, 14 to quickly and simultaneously locate bore guides 18 relative to the base structure 30.

Figure 6:
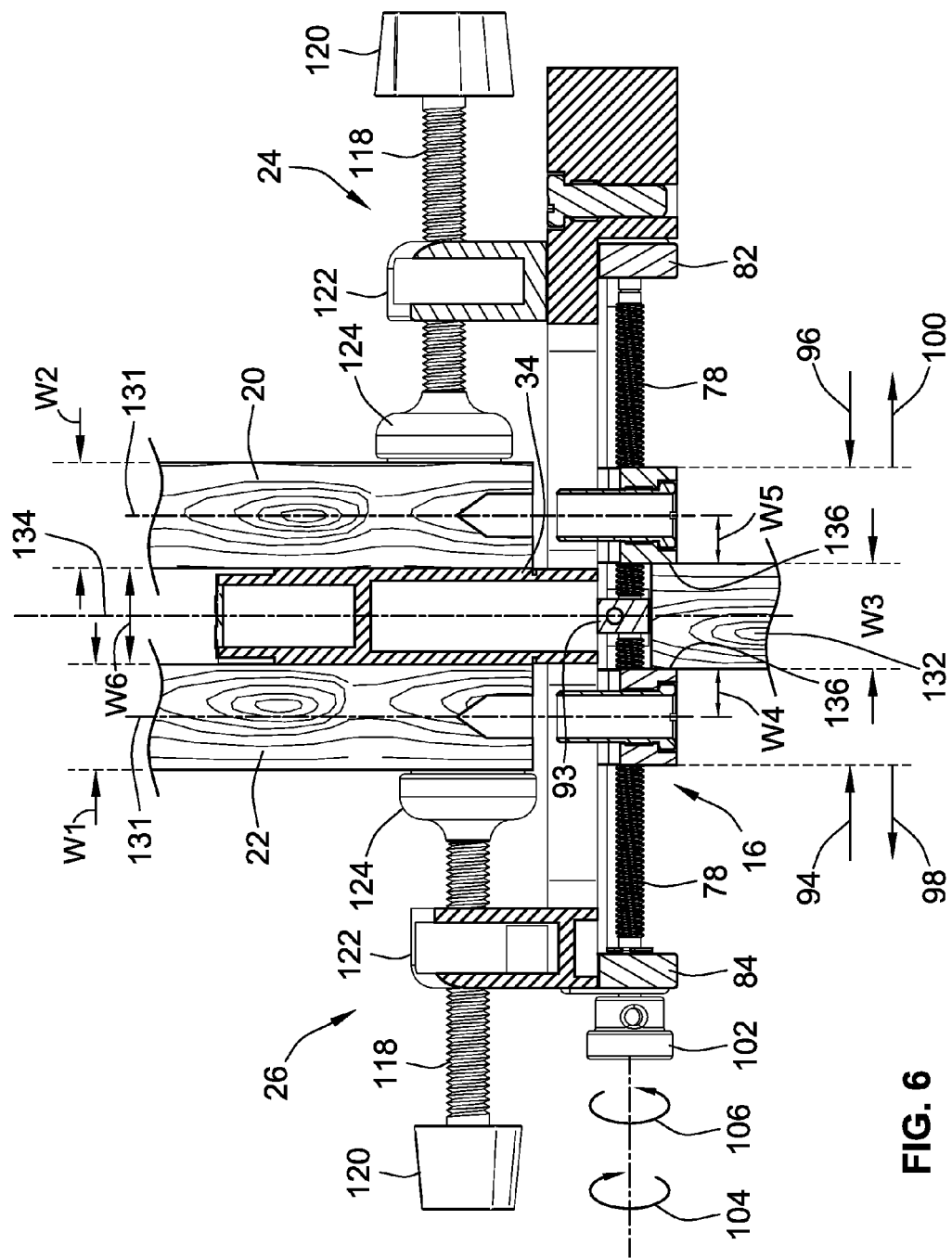
FIG. 6 is a front cross sectional view of the doweling jig of FIG. 1, with work pieces and a reference work piece clamped thereto.

With reference to FIG. 6, the adjustment mechanism 16 advantageously allows for the simultaneous adjustment of position of each bore guide carrier 12, 14 in a single operation via manipulation of a handle 102 attached to an end of the lead screw 78. By rotating the handle 102 clockwise as illustrated by directional arrow 104, the bore guide carriers 12, 14 will move in equal and opposite directions represented by directional arrows 94, 96 toward one another. Similarly, by rotating the handle 102 counterclockwise as illustrated by directional arrow 106, the bore guide carriers 12, 14 will simultaneously move in equal and opposite directions represented by directional arrows 98, 100 away from one another. It is recognized that the above operation could be reversed such that rotation of the handle 102 and direction 106 will cause the bore guide carriers 12, 14 to move simultaneously in equal and opposite directions represented by arrows 94, 96, etc.

Each clamp assembly 24, 26 has a clamp mount 122 with a threaded rod 118 extending therethrough. A clamp body 124 is affixed to one end of the threaded rod 118 and a handle 120 is affixed to the other end of the threaded rod 118. As can be readily appreciated from FIG. 6, rotation of the handle 120 causes the subsequent tightening or loosening of clamping a work piece 20, 22 between clamp body 124 and abutment portion 34.

As illustrated, the work pieces 20, 22 are clamped to the doweling jig 10 to form dowel holes in their end faces so that a face joint between the two work pieces 20, 22 will be formed. As explained above, the location of the bore guides 18 will govern the position of the resultant dowel holes 11 (FIG. 1) of the work pieces 20, 22. The position of the bore guide carriers 12, 14 can be adjusted and determined using the visual indicator 15 and linear scale 17 as described above and illustrated in FIG. 1.

Alternatively, a reference work piece 132, e.g. typically one of the work pieces 20, 22 prior to clamping the same to the adjustable doweling jig 10 as described above, can be used to set the position of the bore guide carriers 12, 14. As discussed above, the bore guide carriers 12, 14 move in equal and opposite directions toward and away from abutment portion 34. As illustrated in FIG. 6, the bore guide carriers 12, 14 are generally arranged symmetrically relative to a center line 134 of the abutment portion 34.

Each bore guide carrier 12, 14 has an inner peripheral surface 136 that can be used to clamp the reference work piece 132 between the bore guide carriers 12, 14 by turning the lead screw 78 in the appropriate direction using the handle 102. It will be recognized from inspection of FIG. 6 that the inner peripheral surface 136 of one bore guide carrier 12 faces the inner peripheral face 136 of the adjacent bore guide carrier 14. As such, each inner peripheral face 136 serves as a reference abutment to the adjacent bore guide carrier 12, 14.

When the inner peripheral surfaces 136 make contact with one another, a reference engagement line 134 is defined. When the bore guide carriers 12, 14 are adjusted such that the reference work piece 132 is clamped therebetween, the reference work piece 132 will be generally centered on the reference engagement line 134. When the reference engagement line 134 also coincides with the center of the abutment structure 34, the reference workpiece 132 will likewise be centered relative to the abutment structure.

Put differently, in certain embodiments such as that illustrated, the reference engagement line 134, center line of the abutment structure 34, and centerline of a workpiece can be coincident. However, in other embodiments, the above reference lines need not be aligned.

In the illustrated embodiment of FIG. 6, the work pieces 20, 22 and reference work piece 132 have widths respectively represented by dimensions W1, W2, and W3. The distance between the peripheral surface 136 of one bore guide carrier 12 and a center axis 131 of a bore guide 18 carried by the same bore guide carrier 12 is represented by dimension W4. The distance between the peripheral surface 136 of the other bore guide carrier 14 and a center axis 131 of a bore guide 18 carried by the same bore guide carrier 14 is represented by dimension W5. The distance between the first and second reference surfaces 38 and 40 is represented by dimension W6.

It will be recognized that one way to ensure the adjustable doweling jig places symmetric dowel holes on the workpieces 20, 22 of FIG. 6 is to manufacture the doweling jig 10 such that the center axis 131 of the bore guides 18 carried by one bore guide carrier 12 will coincide with the first abutment surface 38, and the center axis of the bore guide 18 carried by the other bore guide carrier 14 will coincide with the second abutment surface 40 when/if the inner peripheral surfaces 136 of the bore guide carriers 12, 14 are in contact.

As the adjustment mechanism 16 moves the bore guide carriers 12, 14 along directions 94, 96 respectively away from one another, the center axis 131 of the bore guides 18 of one bore guide carrier 12 from the first abutment surface 38 will be the same distance as the center axis 131 of the bore guides 18 carried by the other bore guide carrier 14 from the second abutment surface 40. As a result, the dowel holes 11 (see FIG. 1) will be symmetric. Put another way, the dowel holes 11 drilled in one workpiece 20 will be the same distance from the first abutment surface 38 (and likewise a reference surface 133 of that workpiece 20 in contact with the first abutment surface 38) as the dowel holes 11 drilled in the other workpiece 22 from the second abutment surface (and likewise a reference surface 135 of that workpiece 22 in contact with the second abutment surface 40). Accordingly, the workpieces 20, 22 will present a very flat surface when joined together with a minimized or substantially reduced edge at their union.

Additionally, where the widths W1, W2 of the workpieces 20, 22 are equal to the width W3 of the reference workpiece 132, and the sum of widths W4 and W5 is equal to width W6, the doweling jig will quickly auto-center the center axes 131 of the bore guides 18 on the centers of the widths W1, W2 of workpieces 20, 22 respectively. It will be recognized that when the sum of widths W4 and W5 is equal to width W6, and the axes 131 of the bore guides 18 of each bore guide carrier 12, 14 are respectively coincident with the abutment surfaces 38, 40, the inner peripheral surfaces 136 will also be in contact with one another. When a reference workpiece 132 of the same width W3 as the work pieces 20, 22 is clamped between the inner peripheral surfaces 136, the axis 131 of the bore guides 18 carried by one bore guide carrier 12 will have moved away from the first abutment surface 38 half of the width W3 (and accordingly half of width W1 of workpiece 20) of the reference workpiece 132. Likewise, the center axis 131 of the bore guides 18 carried by the other bore guide carrier 14 will also have moved away from the second abutment surface 40 half the width W3 (and accordingly half of the width W2) of the reference workpiece 132.

To proceed according to the above, an operator can simply clamp two work pieces 20, 22 of the same widths W1 and W2 in the doweling jig 10. An operator can thereafter clamp a reference work piece 132 of width W3 between the bore guide carriers 12, 14 by positioning the reference work piece 132 between the bore guide carriers 12, 14 and rotating the handle 102 of the adjustment mechanism in the appropriate direction to cause the bore guide carriers 12, 14 to move in directions 98, 100 respectively. Alternatively, an operator can first adjust the position of the bore guide carriers 12, 14 using a reference workpiece 132, then clamp workpieces 20, 22 to the jig 10.

As another alternative, where the widths W1 and W2 of the workpieces 20, 22 are equal, an operator can first position the bore guide carriers 12, 14 using one of the workpieces 20, 22, then remove it and clamp it to the jig, along with the other workpiece 20, 22. As a result, the bore guides 18 will auto-center as described above when proceeding according to this alternative. As yet another alternative, and referring back to FIG. 2, an operator can use the indicators 15 of the bore guide carriers 12, 14 and the linear scale 17 of the base structure 30 to position the bore guides 18 at the desired location.

Figure 7:
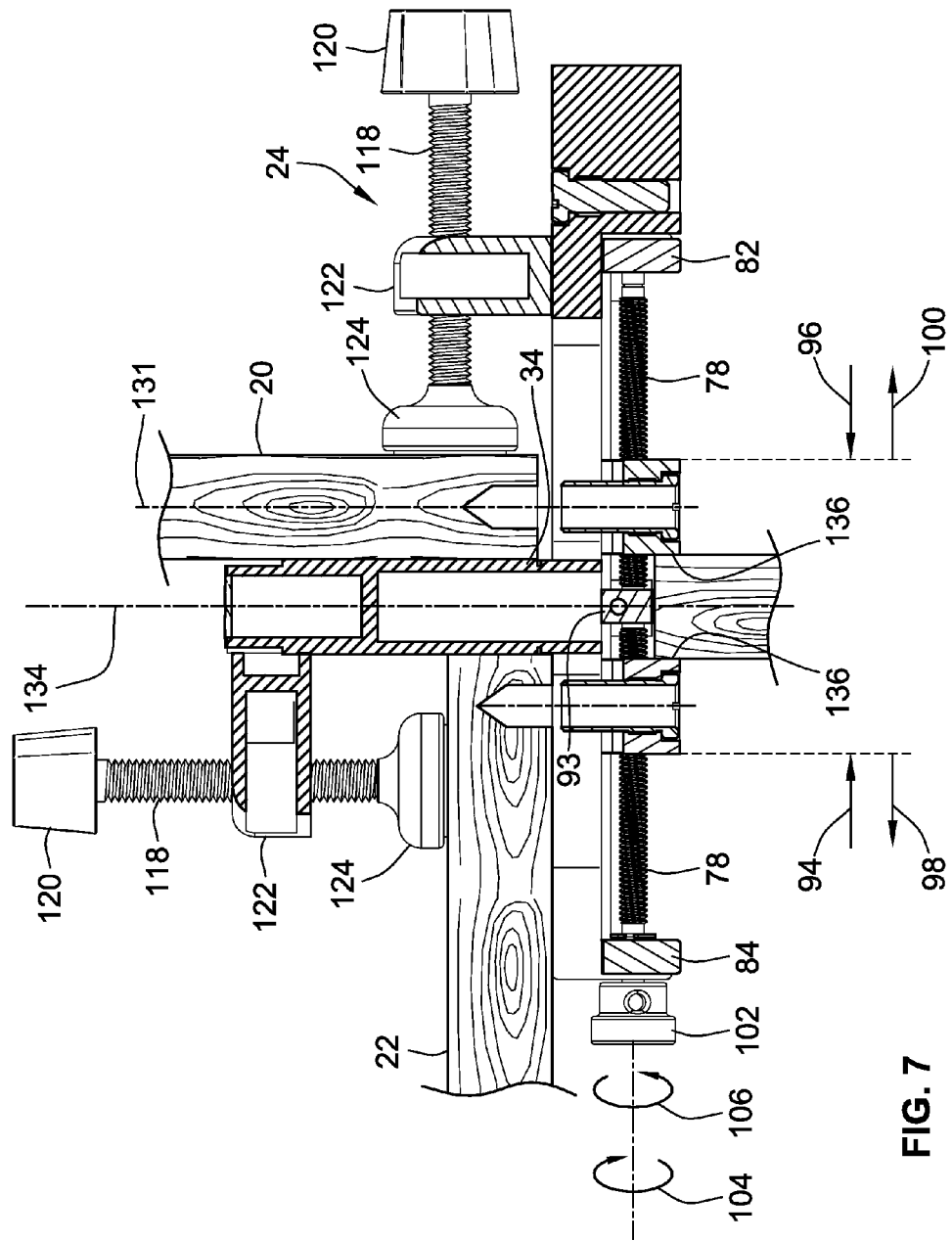
FIG. 7 is a side cross sectional view of the adjustable doweling jig of FIG. 1 in an alternate configuration.
Figure 8:
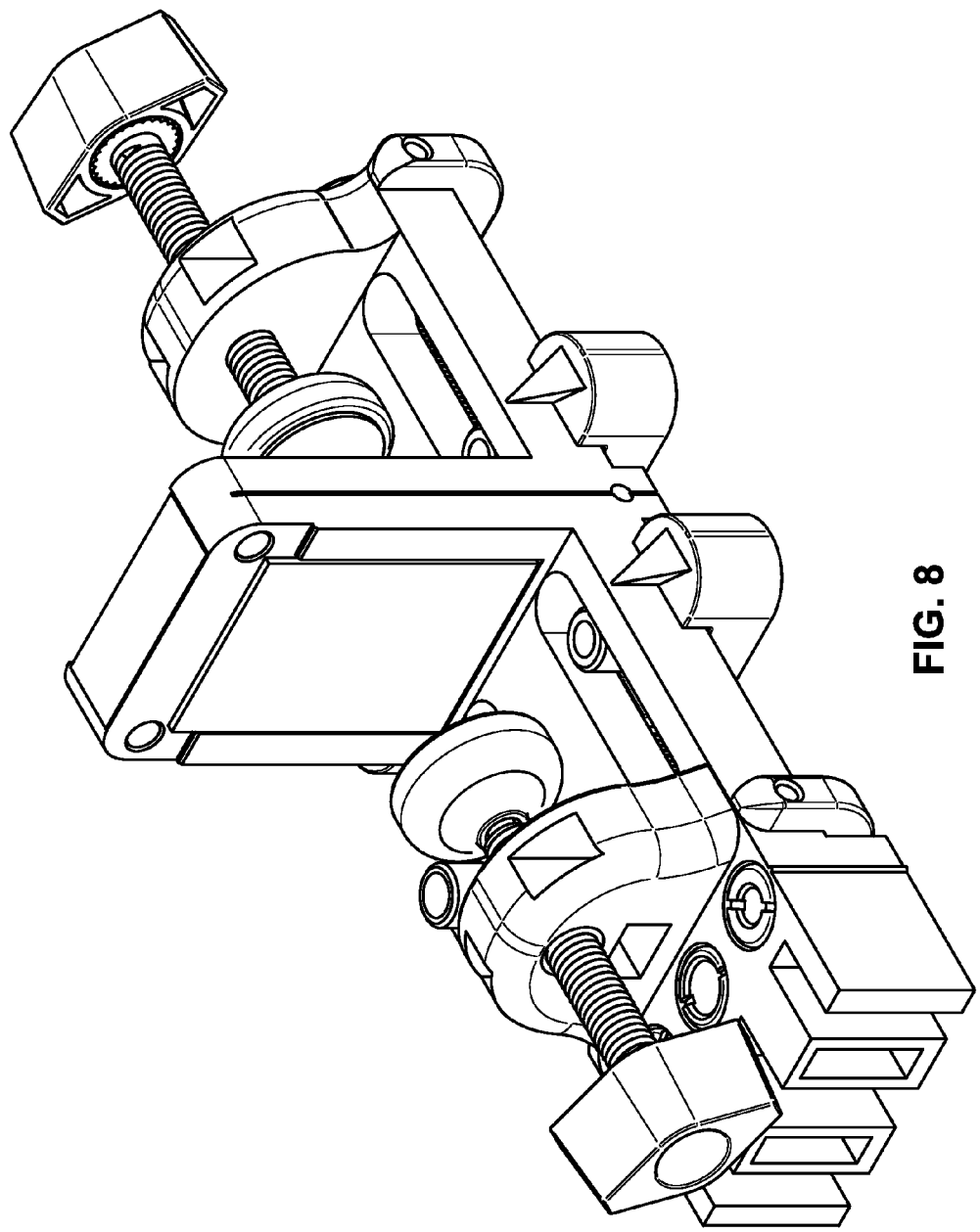
FIG. 8 is a perspective view of the doweling jig of FIG. 1.
Figure 9:
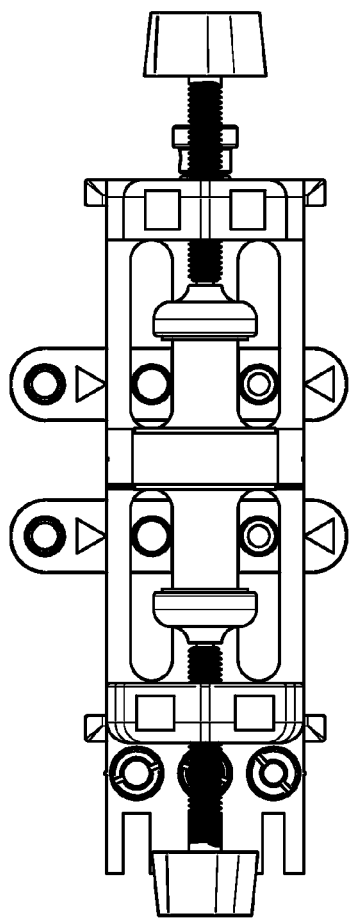
FIG. 9 is a top view of the doweling jig of FIG. 1.
Figure 11:
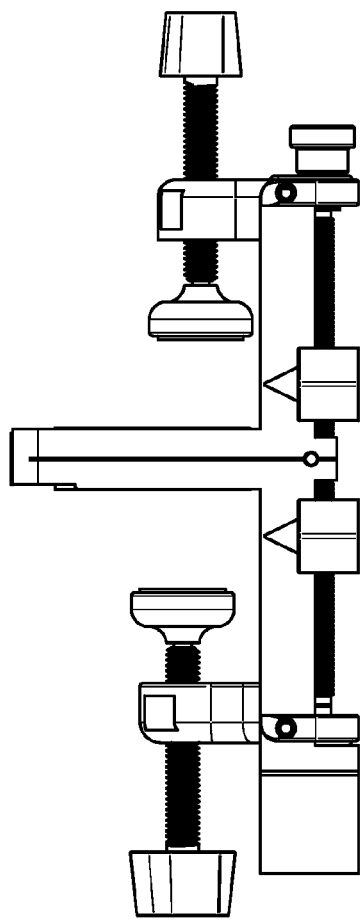
FIG. 11 is a front view of the doweling jig of FIG. 1.
Figure 10:
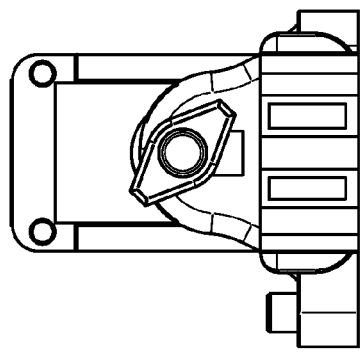
FIG. 10 is a left side view of the doweling jig of FIG. 1.
Figure 13:
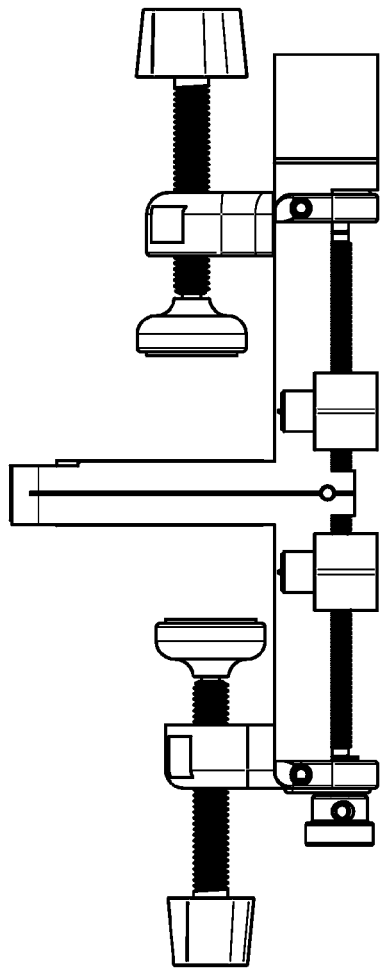
FIG. 13 is a back view of the doweling jig of FIG. 1.
Figure 14:
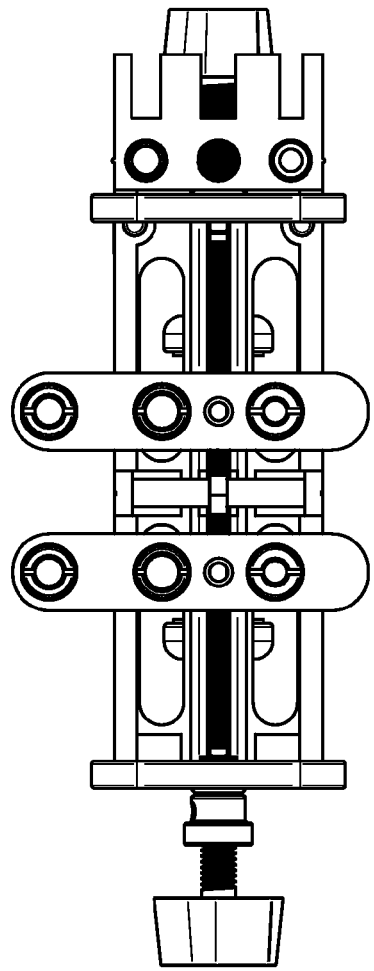
FIG. 14 is a bottom view of the doweling jig of FIG. 1.
Figure 12:
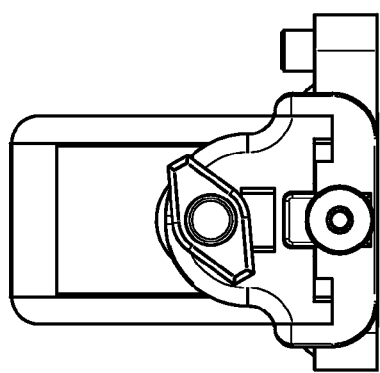
FIG. 12 is a right side view of the doweling jig of FIG. 1.

Referring to FIG. 7, one of the clamp assemblies 24, 26 is selectively removable so that work pieces 20, 22 can be clamped in the adjustable doweling jig 10 such that they are generally transverse to one another. Such a configuration is advantageous for manufacturing dowel holes for corner joints, e.g. right angle joints. To facilitate this functionality, one or both of the clamp assemblies 24, 26 has a pair of mounting posts 130 (see FIG. 1) extending from a bottom thereof. The mounting posts 130 are received by the mounting holes 44 (see FIG. 2) of the abutment portion 34 of the base structure 30. It is recognized that both clamp assemblies 24, 26 can be removable, and positioned on either side of the abutment portion 34 to accommodate various joint configurations.

Once one of the clamp assemblies 24, 26 is repositioned as illustrated, and the work pieces 20, 22 are clamped to the doweling jig 10, an operator can adjust the position of the bore guide carriers 12, 14 and likewise the bore guides 18 carried thereby as described above using the adjustment mechanism 16. The operator can determine the location of the bore guides 18 using the indicator 15 and scale 17 (see FIG. 1) as described above, or the operator can use a reference work piece 132 also as described above.

As described herein, the adjustable doweling jig 10 accomplishes the above noted advantages in part by using a pair of adjustable bore guide carriers 12, 14 that can be quickly and simultaneously adjusted symmetrically relative to a base structure 30. As a result, embodiments of the adjustable doweling jig 10 overcome many of the existing problems in the art as describe in the foregoing.

FIGS. 15-23 illustrate an alternate embodiment of the doweling jig 10 described at FIGS. 1-14. As will be described in greater detail below, this embodiment of doweling jig 210 shown at FIGS. 15-23 differs from doweling jig 10 shown in FIGS. 1-14 in two primary aspects. First, doweling jig 210 incorporates adjustable bore guide carriers 212, 214 which differ in their means of adjustment than bore guide carriers 12, 14 described above relative to FIGS. 1-14. Second, unlike the base structure 30 that has a unitary abutment portion 34 and horizontal portion 36, doweling jig 210 incorporates an assembled configuration including base structure 230 which has an abutment structure 234 that is received by a horizontal structure 236. Each of these features will be discussed in turn in the following.

Figure 15:
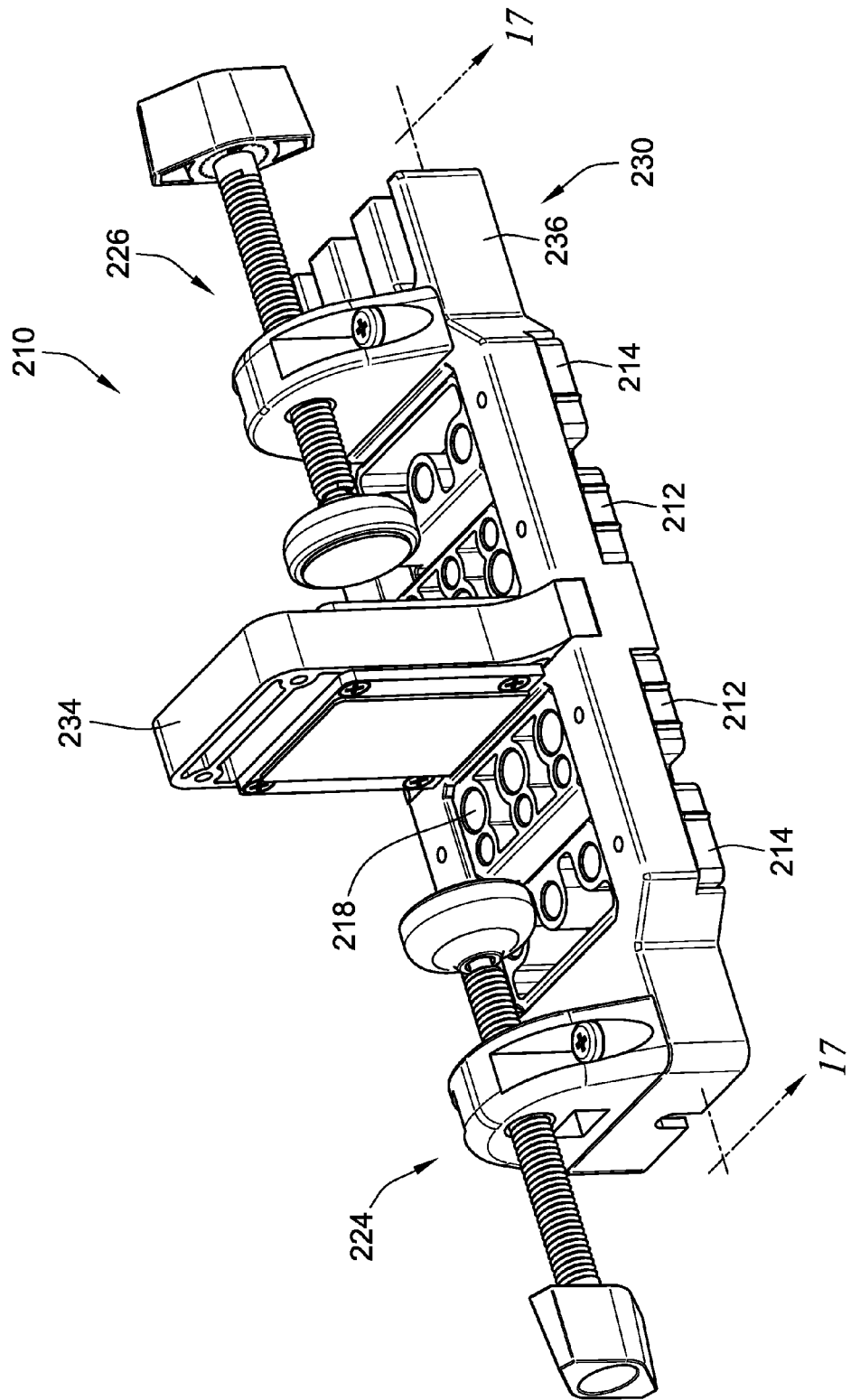
FIG. 15 is a perspective view of an another embodiment of a doweling jig according to the teachings of the present invention.

As shown in FIG. 15, doweling jig 210 includes a pair of inner most bore guide carriers 212 on either side of abutment structure 234, and outer most bore guide carriers 214 on either side of abutment structure 234. Each bore guide carrier 212, 214 includes a plurality of bore guides 218 that are integrally formed with their respective bore guide carriers 212, 214. Bore guides 218 function in the same manner as described above relative to bore guides 18 of FIGS. 1-14. Each of bore guide carriers 212, 214 are removable from base structure 230. More specifically, inner most bore guide carriers 212 incorporate two different sizes of bore guides 218. Likewise, outer most bore guide carriers 214 include yet another size of bore guide 218. Each of bore guide carriers 212, 214 are removable and repositionable relative to one another in base structure 230 to position the desired bore guide 218 which will be used.

Figure 16:
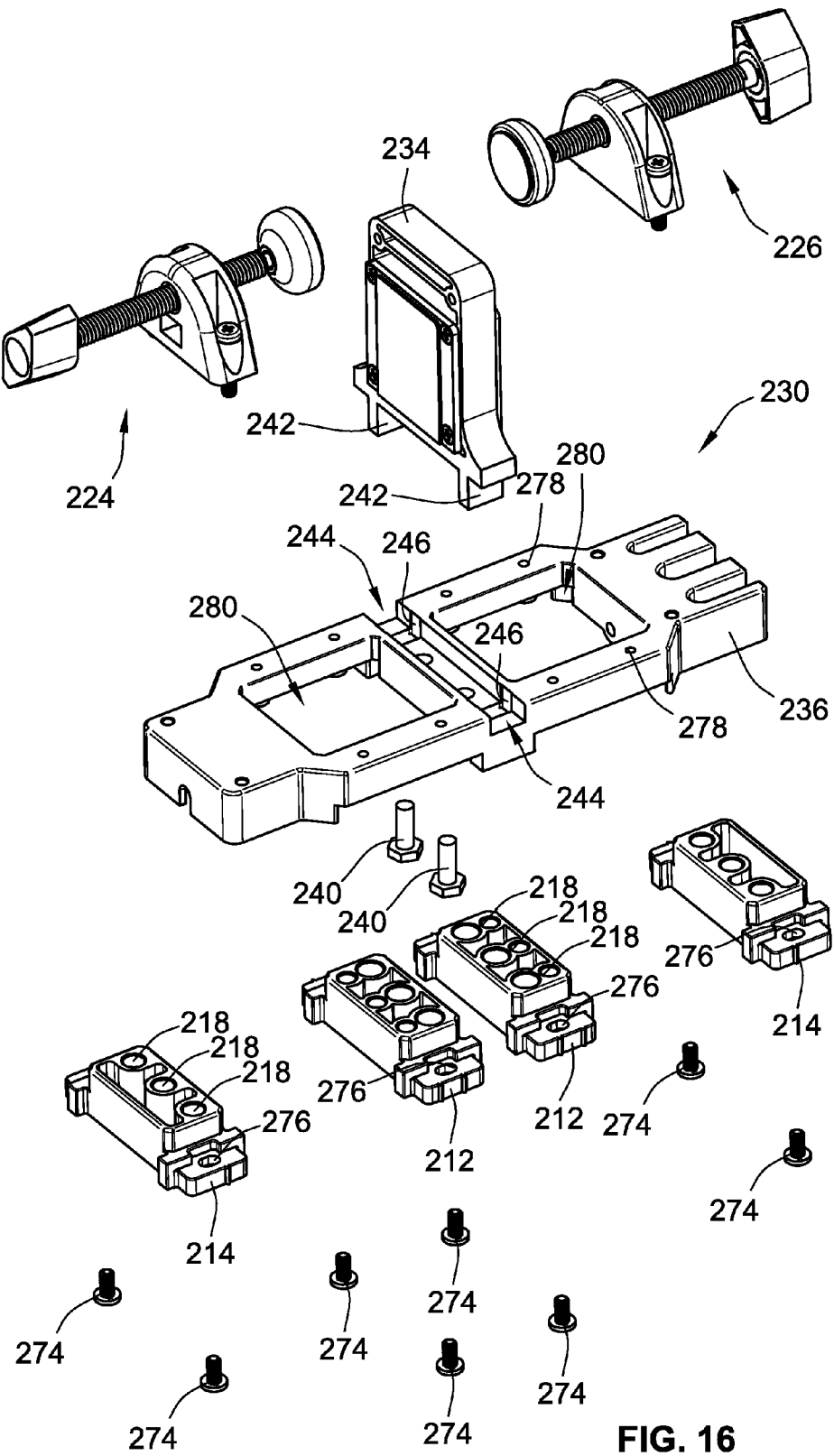
FIG. 16 is a perspective exploded view of the doweling jig of FIG. 15.

Turning now to FIG. 16, bore guide carriers 212, 214 are shown in an exploded view relative to base structure 230. Each bore guide carrier 212, 214 includes slotted holes 276. Mounting screws 274 pass through slotted holes 276 of each bore guide carrier 212, 214 and are installed in threaded holes 278 formed on base structure 230. Each bore guide carrier 212, 214 is interchangeable with each other bore guide carrier 212, 214 by unscrewing mounting screws 274 and interchanging the desired bore guides 212, 214. When fully installed, the bore guides 218 of each bore guide carrier 212, 214 extend through openings 280 formed in base structure 230.

Still referring to FIG. 16, clamping assemblies 224, 226 operate in the same manner as clamping assemblies 24, 26 described above relative to FIGS. 1-14. Indeed, each clamping assembly 224, 226 can mount to horizontal structure 236 of base structure 230 or abutment structure 234 of base structure 230 depending on the desired joints to be formed.

Abutment structure 234 is a separate component from horizontal structure 236 and attaches thereto via mounting bolts 240. As can be seen from comparison of FIG. 16 to FIG. 4, abutment structure 234 provides upright abutment surfaces in the same manner as abutment portion 34 described at FIGS. 1-14. Abutment structure 234, however, also includes locating tabs 242 which are received in locating slots 244 of horizontal structure 236. Each locating slot 244 includes opposed machined surfaces 246 which are locating surfaces for locating locating tabs 242 to ultimately maintain perpendicularity of abutment structure 234 relative to horizontal structure 236. Such a configuration advantageously allows for horizontal structure 236 to be manufactured from a process such as casting. Thereafter, only minimum machining of locating surfaces 246 is required to insure that abutment structure 234 will maintain perpendicularity with horizontal structure 236. Additionally, locating tabs 242 are also machined to insure a precise fit between locating tabs 242 and locating slots 244. Indeed, the outer most surfaces of locating tabs 242 which face opposed locating surfaces 246 can be machined in a single operation and set up to maintain a high degree of dimensional stability.

Figure 17:
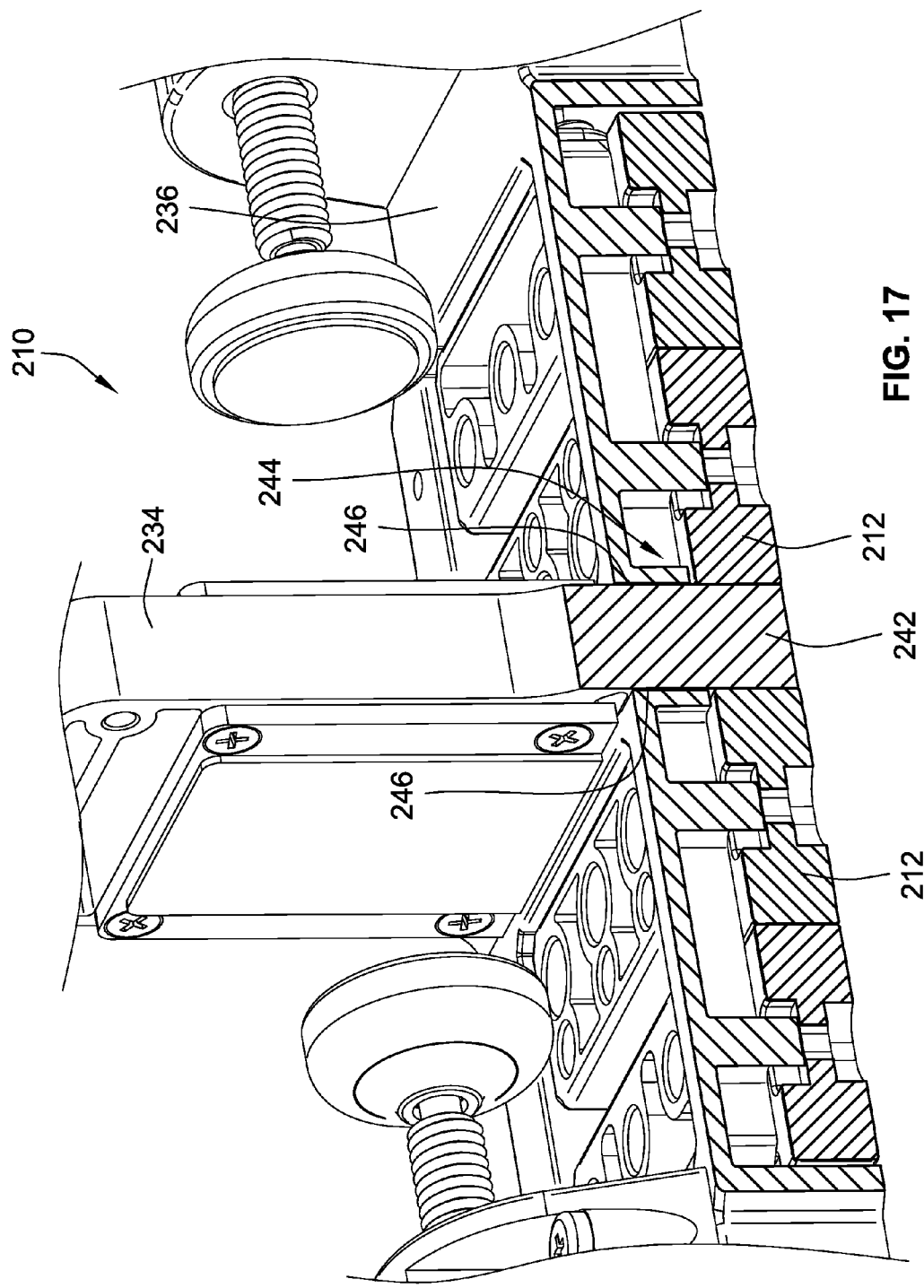
FIG. 17 is a perspective partial cross section of the doweling jig of FIG. 15.

Turning now to FIG. 17, a cross-section of doweling jig 210 is illustrated depicting the interaction between locating tabs 242 and locating slots 244. As can be seen in FIG. 17, locating tabs 242 are installed in locating slots 244. The outer surfaces of locating tabs 242 are in contact with locating surfaces 246 of locating slot 244. Such interaction between locating tabs 242 and locating surfaces 246 insures a high degree of perpendicularity of abutment structure 234 relative to base structure 236.

Figure 18:
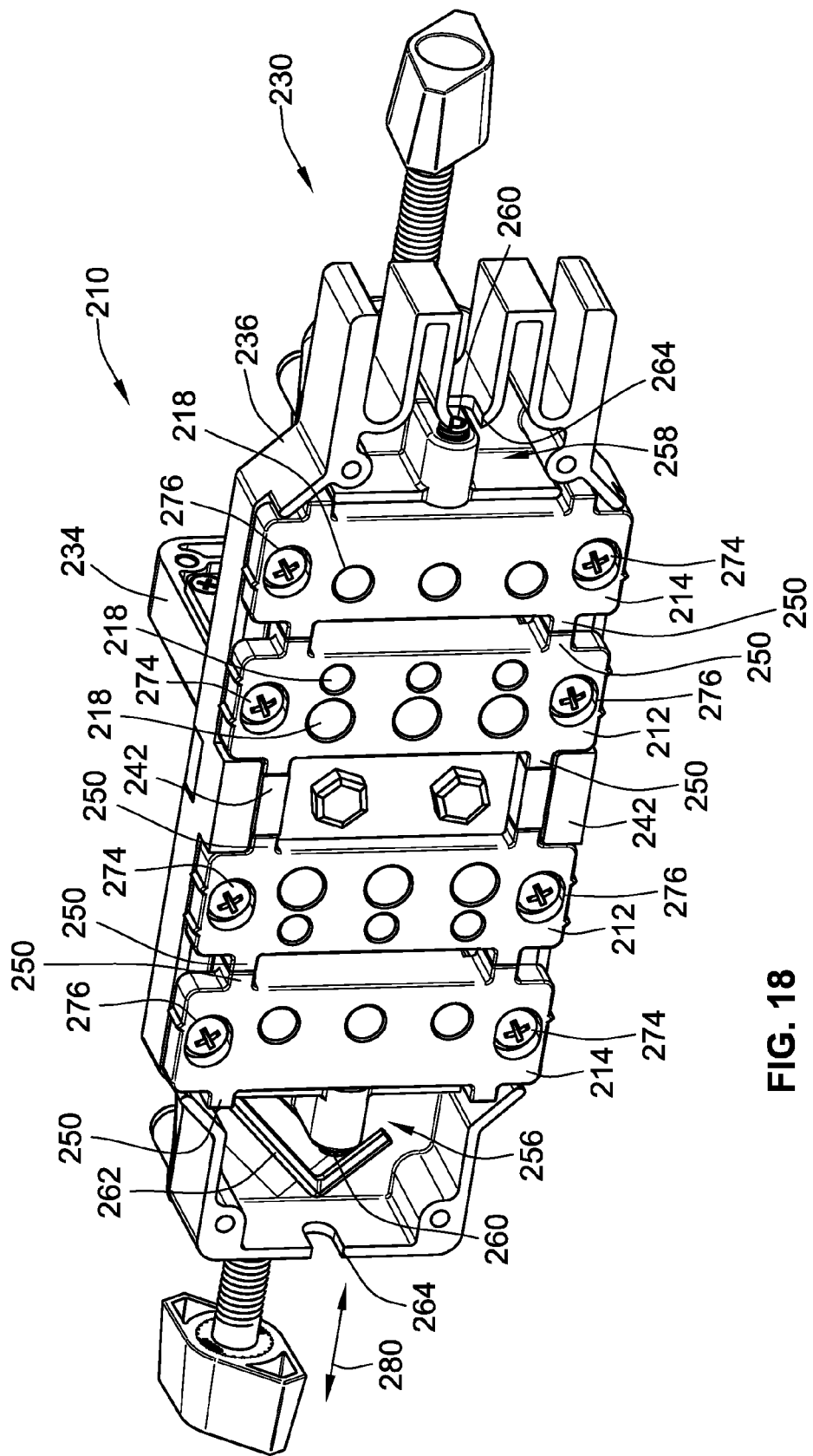
FIG. 18 is a bottom perspective view of the doweling jig of FIG. 15.
Figure 19:
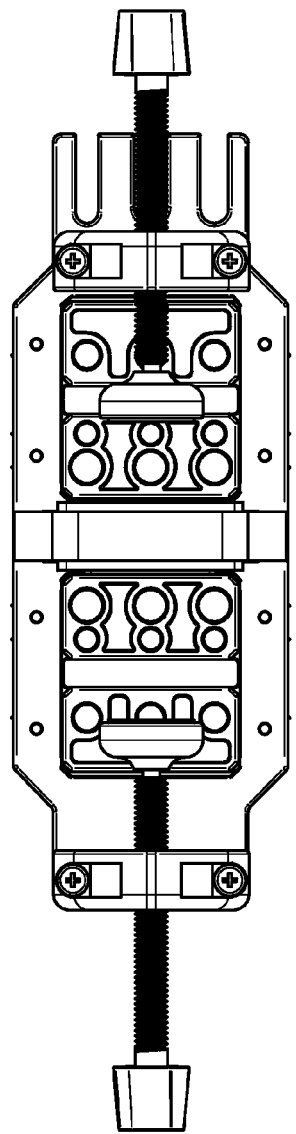
FIG. 19 is a top view of the doweling jig of FIG. 15.
Figure 21:
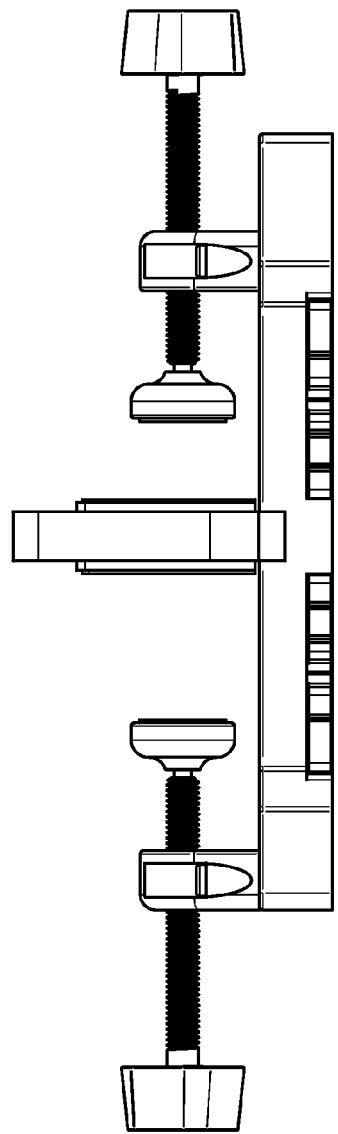
FIG. 21 is a front view of the doweling jig of FIG. 15.
Figure 20:
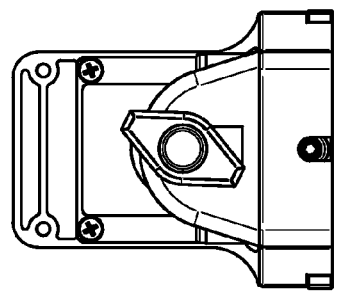
FIG. 20 is a side view of the doweling jig of FIG. 15.
Figure 23:
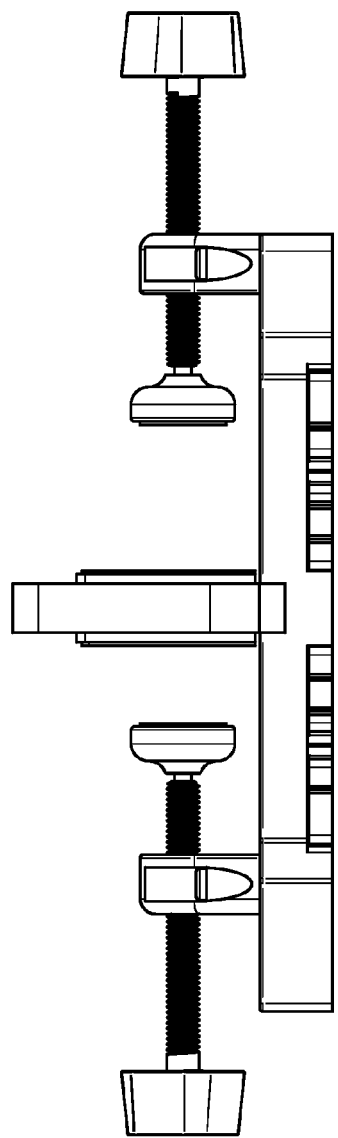
FIG. 23 is a back view of the doweling jig of FIG. 15.
Figure 22:
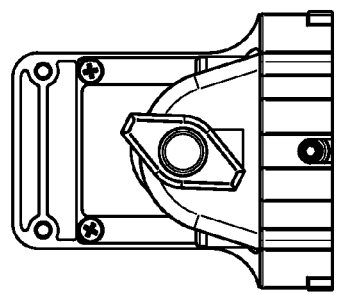
FIG. 22 is a side view of the doweling jig of FIG. 15, opposite the side shown in FIG. 20.

Turning now to FIG. 18, a bottom view of doweling jig 210 is illustrated. As can be seen in FIG. 18, each locating tab 242 extends through locating slots 244 (See FIG. 17) approximately to the bottom most extents of horizontal structure 236. Each bore guide carrier 212, 214 includes projections 250 which are in abutted contact with one another with the exception of inner most projections 250 of each bore guide carrier 212. The inner most projections 250 of bore guide carriers 212 are in abutted contact with locating tabs 242. As a result, bore guide carriers 212 locate off of locating tabs 242 to position their respective bore guides 218. When a workpiece is installed in doweling jig 210, the same will also locate off of abutment structure 234 as described above so that bore guide carriers 212 and a workpiece installed in doweling jig 210 commonly locate off of the same datum. The subsequent abutment of projections 250 of outmost bore guide carriers 214 with projections 250 of inner most bore guide carriers 212 as illustrated also serves to locate the bore guides 218 of outer most bore guide carriers 214 in a highly accurate manner.

Still referring to FIG. 18, a pair of adjustment mechanisms 256, 258 are also provided to insure the accurate location of each bore guide carrier 212, 214 and their respective bore guides 218. More specifically, each adjustment mechanism 256, 258 includes a set screw 260 which is in abutted contact with outer most bore guide carriers 214 to bias the same inward such that the inner most projections 250 of each outer most bore guide carrier 214 abut the outer most projections 250 of each inner most bore guide carrier 212, and the inner most projections 250 of bore guide carriers 212 abut locating tabs 242 as described above. Slotted holes 276 which receive mounting screws 274 permit movement of each bore guide carrier 212, 214 in a direction parallel to axis 280. Adjustment of each bore guide carrier 212, 214 along axis 280 is effectuated by turning each set screw 260 using tool 262. Slots 264 are provided so that set screws 260 may be accessed via tool 262 from an exterior of horizontal structure 236. As a result, each of bore guide carriers 212, 214 is adjustable in a similar manner as that of bore guide carriers 12, 14 described above relative to FIGS. 1-14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An adjustable doweling jig, comprising:
   a base structure including an abutment portion that defines a first locating surface for locating a workpiece;
   at least one adjustable bore guide carrier mounted to the base structure and adjustable relative thereto;
   wherein the at least one adjustable bore guide carrier is in abutted contact with a second locating surface provided by the base structure;
   at least one adjustment mechanism for biasing the at least one bore guide carrier into abutted contact with the at least one second locating surface;
   wherein the base structure includes a horizontal structure, and an abutment structure removable from the horizontal structure;
   wherein the abutment structure includes a pair of locating tabs and the horizontal structure includes a pair of locating slots, the locating tabs received by the locating slots when the abutment structure is installed in the horizontal structure; and
   wherein the at least one adjustable bore guide carrier is received through an opening formed through the base structure.

2. The adjustable doweling jig of claim 1, wherein each locating slot includes a pair of machined locating surfaces in opposed spaced relation, the pair of machined locating surfaces spaced at a distance substantially equal to a width of each of the pair of locating tabs.

3. The adjustable doweling jig of claim 1, wherein the at least one adjustable bore guide carrier includes a pair of inner most bore guide carriers, and a pair of outer most bore guide carriers.

4. The adjustable doweling jig of claim 3, wherein the inner most bore guide carriers include inner most projections which abut the second locating surface and include outer most projections which abut inner most projections of the outer most bore guide carriers.

5. The adjustable doweling jig of claim 4, wherein the at least one adjustment mechanism includes a pair of adjustment mechanisms.

6. The adjustable doweling jig of claim 5, wherein each of the pair of adjustment mechanisms includes a set screw.

7. The adjustable doweling jig of claim 6, wherein one set screw is positioned to bias one of the outer most pair of bore guide carriers into abutted contact with one of the inner most pair of bore guide carriers, and wherein the other set screw is positioned to bias the other one of the outer most pair of bore guide carriers into abutted contact with the other one of the inner most pair of bore guide carriers.

8. An adjustable doweling jig, comprising:
   a base having an abutment structure and a horizontal structure;
   a first and a second bore guide carrier positioned on either side of the abutment structure, the first and second bore guide carriers received through an opening formed through the horizontal structure;
   an adjustment mechanism for adjusting the position of each of the first and second bore guide carriers relative to the abutment structure;
   wherein the base includes a horizontal structure, the abutment structure removably mounted to the horizontal structure;
   wherein the abutment structure includes a pair of locating tabs each having machined opposed first locating surfaces, and wherein the horizontal structure includes a pair of locating slots each having a pair of machined opposed second locating surfaces, the first and second machined locating surfaces in contact with one another such that the abutment structure is substantially perpendicular to the horizontal structure.

9. An adjustable doweling jig, comprising:
a base having an abutment structure and a horizontal structure;
a first and a second bore guide carrier positioned on either side of the abutment structure, the first and second bore guide carriers received through an opening formed through the horizontal structure;
an adjustment mechanism for adjusting the position of each of the first and second bore guide carriers relative to the abutment structure;
wherein the adjustment mechanism includes a first set screw positioned to bias the first bore guide carrier towards the abutment structure, and the adjustment mechanism includes a second set screw positioned to bias the second bore guide carrier towards the abutment structure.

10. The doweling jig of claim 9, wherein the base includes a horizontal structure, the abutment structure removably mounted to the horizontal structure.

11. The doweling jig of claim 10, wherein the first and second bore guide carriers are removably mounted to the horizontal structure.

* * * * *